United States Patent [19]

Kawamura et al.

[11] Patent Number: 4,926,268
[45] Date of Patent: May 15, 1990

[54] IMAGE PROCESSING APPARATUS WHICH CONVERTS M-BIT IMAGE DATA TO N-BIT (N>M) IMAGE DATA

[75] Inventors: Naoto Kawamura, Yokohama; Yuji Nishigaki, Odawara; Hidefumi Ohsawa, Urawa, all of Japan

[73] Assignee: Canon Kabushiki Kaisha, Tokyo, Japan

[21] Appl. No.: 282,896

[22] Filed: Dec. 12, 1988

Related U.S. Application Data

[63] Continuation of Ser. No. 13,629, Feb. 11, 1987, abandoned.

[30] Foreign Application Priority Data

| Feb. 14, 1986 | [JP] | Japan | 61-29071 |
| Mar. 6, 1986 | [JP] | Japan | 61-49172 |
| Apr. 4, 1986 | [JP] | Japan | 61-76680 |

[51] Int. Cl.$^5$ ............................................. H04N 1/40
[52] U.S. Cl. ................................... 358/458; 358/298; 358/456
[58] Field of Search ............... 358/283, 280, 298, 448, 358/455, 456, 457, 458, 459, 460

[56] References Cited

U.S. PATENT DOCUMENTS

| 3,848,087 | 11/1974 | Carrell | 358/264 |
| 4,004,079 | 1/1977 | Boston | 358/280 |
| 4,032,977 | 6/1977 | Liao | 358/280 |
| 4,194,221 | 3/1980 | Stoffel | 358/283 |
| 4,259,694 | 3/1981 | Liao | 358/283 |
| 4,496,989 | 1/1985 | Hirosawa | 358/283 |
| 4,541,116 | 9/1985 | Lougheed | 382/49 |
| 4,638,369 | 1/1987 | Hsieh | 358/283 |
| 4,698,688 | 10/1987 | Ochi et al. | 358/283 |
| 4,698,691 | 10/1987 | Suzuki et al. | 358/283 |
| 4,763,199 | 8/1988 | Suzuki | 358/456 |
| 4,782,398 | 11/1988 | Mita | 358/283 |
| 4,782,399 | 11/1988 | Sato | 358/283 |
| 4,800,442 | 10/1989 | Riseman et al. | 358/283 |
| 4,803,558 | 2/1989 | Hiratsuka et al. | 358/457 |
| 4,811,037 | 3/1989 | Arai | 358/456 |
| 4,819,066 | 4/1989 | Miyagai | 358/456 |
| 4,831,392 | 5/1989 | Dei | 358/456 |
| 4,847,654 | 7/1989 | Honma et al. | 358/458 |
| 4,847,695 | 7/1989 | Arai | 358/458 |

FOREIGN PATENT DOCUMENTS

| 0024902 | 3/1981 | European Pat. Off. | |
| 57-159172 | 10/1982 | Japan | 358/283 |
| 58-200669 | 11/1983 | Japan | 358/283 |
| 60-102060 | 6/1985 | Japan | 358/283 |
| 60-106269 | 6/1985 | Japan | 358/283 |
| 60-160773 | 8/1985 | Japan | 358/283 |
| 2141898 | 1/1985 | United Kingdom | 358/283 |

OTHER PUBLICATIONS

A. L. Mix, Jr., et al., "Gray Scale to Pseudo Halftone Conversion", IBM Technical Disclosure Bulletin, vol. 20, No. 1, Jun. 1977, pp. 31–32.

Yoshihiro Miyamoto, Abstract for Japanese Kokai 56-91585, Patent Abstracts of Japan, vol. 5, No. 163 (E-78) [835], Oct. 20, 1981.

Hiroyoshi Tsuchiya, "Bilevel Representation of Continuous-Tone Images", National Convention Record, 1985, The Institute of Electronics and Communications Engineers of Japan, Mar. 27-30, 1985, 5-212, p. 1384.

Primary Examiner—James J. Groody
Assistant Examiner—Randall S. Svihla
Attorney, Agent, or Firm—Fitzpatrick, Cella, Harper & Scinto

[57] ABSTRACT

An image processing apparatus of this invention includes a digital data output device for outputting bi-level image data, a bi-level processor for converting the bi-level image data into multi-level (e.g., 8-bit) image data, a multi-level processor for performing spatial filter processing with respect to the multi-level image data output from the bi-level processor, and a PWM circuit for processing the multi-level image data output from the multi-level processor using a pattern signal of a predetermined cycle and generating a PWM signal.

27 Claims, 16 Drawing Sheets

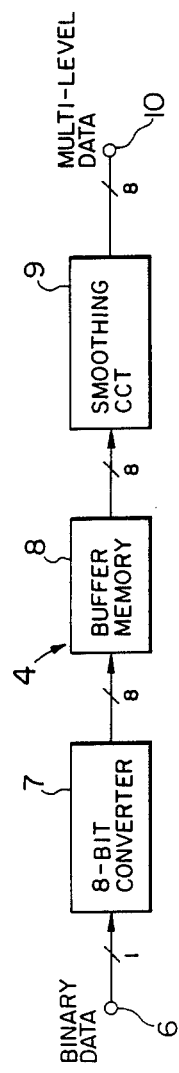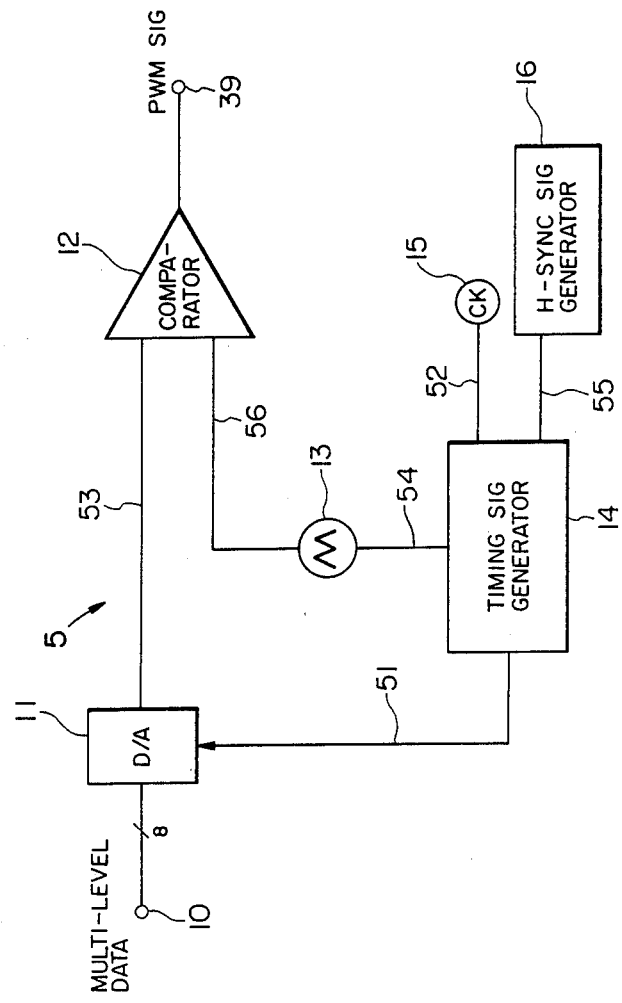

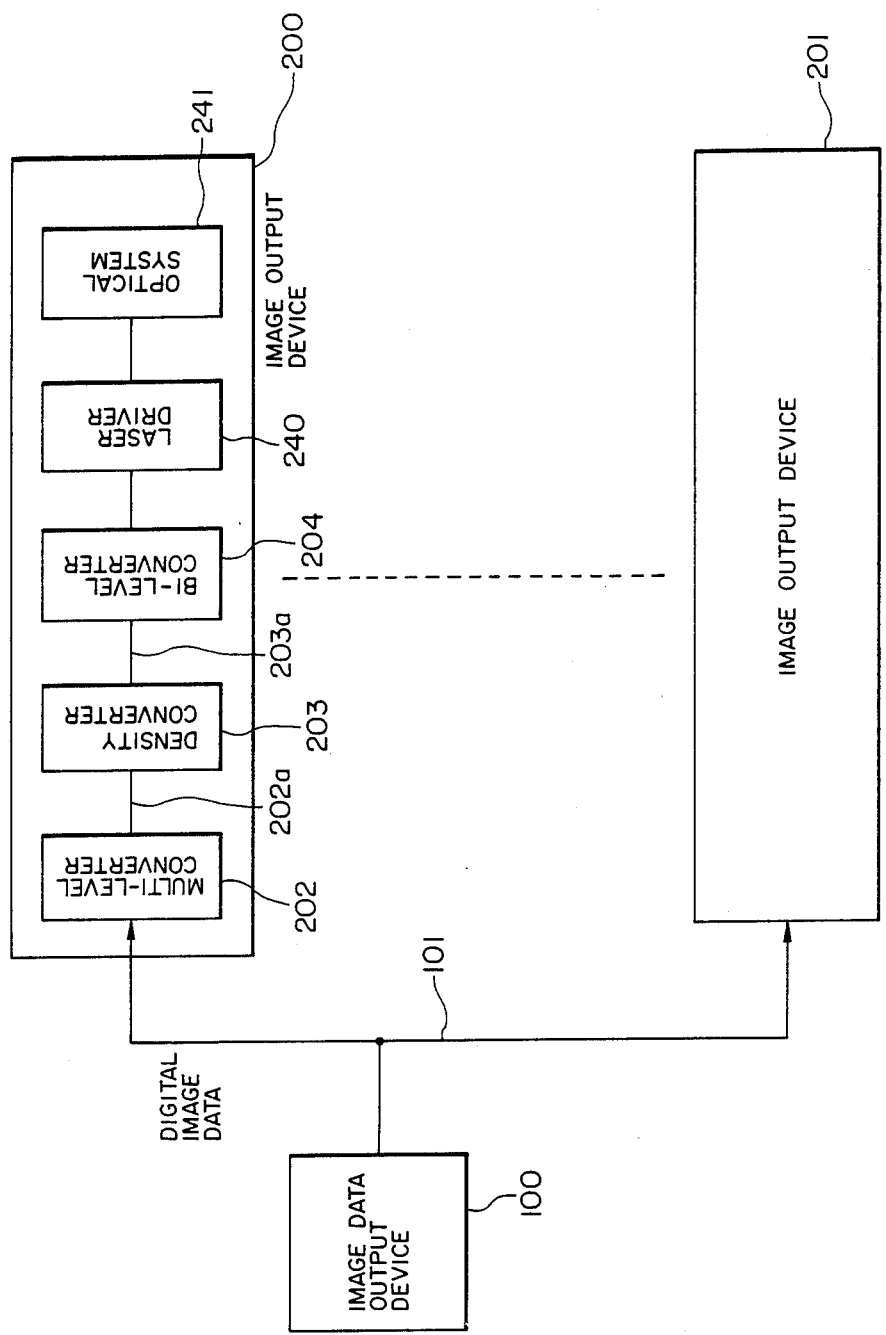

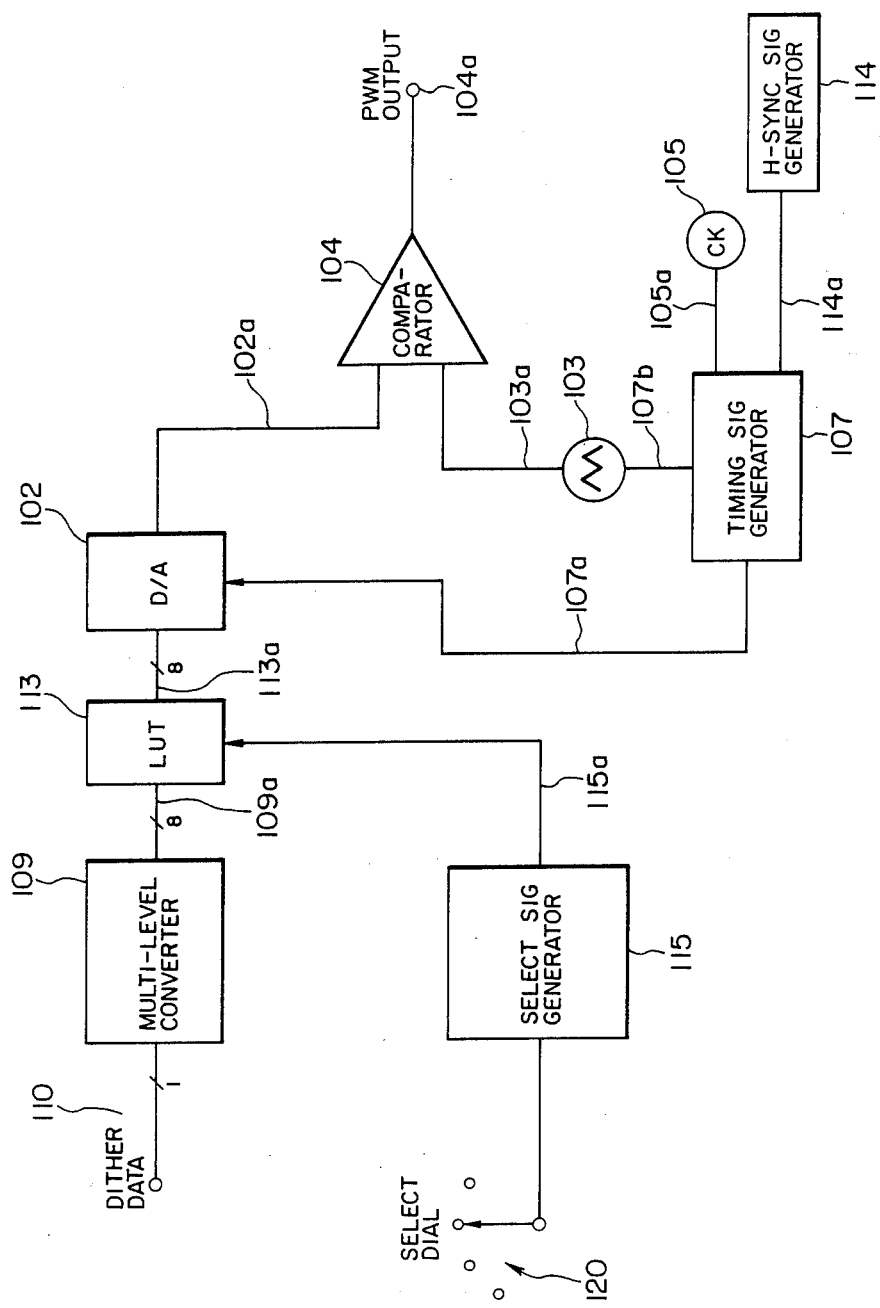

FIG. 17a

DITHERED DATA

| 13 | 9 | 5  | 14 |
|----|---|----|----|
| 8  | 1 | 2  | 10 |
| 12 | 4 | 3  | 6  |
| 16 | 7 | 11 | 15 |

FIG. 17b

ORIGINAL DATA

| 8 | 8 | 8 | 8 |
|---|---|---|---|
| 8 | 8 | 8 | 8 |
| 8 | 8 | 8 | 8 |
| 8 | 8 | 8 | 8 |

FIG. 17c

BI-LEVEL DATA

| 0 | 0 | 1 | 0 |
|---|---|---|---|
| 1 | 1 | 1 | 0 |
| 0 | 1 | 1 | 1 |
| 0 | 1 | 0 | 0 |

FIG. 17d

DECODED DATA

| -1 | -1 | -1 | -1 | 0 | 1 | 1 | 1 | 1 |
|----|----|----|----|---|---|---|---|---|
| -1 | -1 | -1 | -1 | 0 | 1 | 1 | 1 | 1 |
| -1 | -1 | -1 | -1 | 0 | 1 | 1 | 1 | 1 |
| -1 | -1 | -1 | -1 | 0 | 1 | 1 | 1 | 1 |

FIG. 18b

| -1 | -1 | -1 | -1 |
|----|----|----|----|
| -1 | -1 | -1 | -1 |
| -1 | -1 | -1 | -1 |
| -1 | -1 | -1 | -1 |
| 0  | 0  | 0  | 0  |
| 1  | 1  | 1  | 1  |
| 1  | 1  | 1  | 1  |
| 1  | 1  | 1  | 1  |
| 1  | 1  | 1  | 1  |

IMAGE PROCESSING APPARATUS WHICH CONVERTS M-BIT IMAGE DATA TO N-BIT (N>M) IMAGE DATA

This application is a continuation of application Ser. No. 13,629 filed Feb. 11, 1987, now abandoned.

BACKGROUND OF THE INVENTION

1. Field of the Invention

The present invention relates to an image processing apparatus for processing an image signal.

2. Related Background Art

In a conventional digital printer (bi-level printer), since an output is constituted by bi-level data corresponding to on/off of dots, input image data (8 bits) from an input system, e.g., a CCD, is bi-level processed by a dither method, and gradation of an original image is expressed by a matrix consisting of a plurality of pixels. However, in the dither method, a resolution is degraded if gradation is improved. For example, in order to reproduce 17 gray levels including white, a threshold value matrix consisting of 4×4 pixels is necessary, and in order to reproduce 65 gray levels, a threshold value matrix consisting of 8×8 pixels is necessary. Since an output image is represented in units of threshold value matrices, the resolution of a halftone image is degraded as the size of the threshold value matrix increases. When the systematic dither method is used, a threshold value is periodically repeated in units of threshold value matrices. For example, if a dot image is scanned, a difference between original image data and a threshold value periodically varies, and a low-frequency moiré pattern is formed in an output image resulting in a degraded image quality. An averaging error minimization method, wherein an error in an output pixel against original image data is compensated for the surrounding pixels so as to satisfactorily reproduce gradation of the original image data, has been proposed. This method is effective for eliminating moiré pattern. However, pixels are unnaturally connected, and a micro texture structure is formed, resulting in a poor reproduced image. This method is improved by a CAPIX method (National Convention Record of the Institute of Electronics and Communication Engineers of Japan, 1985, 5-212) having good character reproducibility. However, with this method, a micro texture structure is formed again. In the above-mentioned systematic dither method, an edge of the reproduced image, in particular, an inclined thin line, becomes a zigzag pattern.

In the bi-level methods, original image data is compressed at high density in view of data volume. For example, if input image data has 8 bits per pixel, bi-level image data has 1 bit per pixel, resulting in ⅛ compression. Therefore, an image memory, an electronic file system, and the like for accumulating image data need only have a small capacity, and this is advantageous for communication for transferring image data. Thus, the above-mentioned techniques are indispensable for image processing.

With recent improvements in a digital multi-level printer, an image having a higher quality than that obtainable with a conventional digital bi-level printer can be obtained. For this reason, image data which is once compressed to bi-level data by the conventional dither method must be recovered to multi-level data by multi-level processing.

As described above, various methods for outputting an image including a halftone image by a digital printer have been proposed. Such methods include, e.g., the dither method, a density pattern method, and the like. These methods have the following advantages:

(1) An image including a halftone image can be displayed using a bi-level display device.

(2) The hardware arrangement of an apparatus is simple.

(3) A satisfactory image quality can be obtained. For these advantages, the above methods are widely applied in various fields. More specifically, as shown in FIGS. 7A and 7B, pixels (input pixel data) 28 of an input image are assigned to components of a threshold value matrix 25, and black or white is determined in accordance with the relation between the magnitude of the input pixel data and threshold value. The obtained result is output to a display screen 26.

FIG. 7A is for explaining the dither method. One input pixel 28 is assigned to one component of the threshold value matrix 25. FIG. 7B is for explaining the density pattern method. One input pixel 28 is assigned to all the components of the threshold value matrix 25. More specifically, in the density pattern method, one pixel of an input image is displayed by a plurality of cells on the display screen 26.

The dither method and the density pattern method are not essentially different from each other, except that one input pixel is assigned to one or all the pixels of the threshold value matrix. Of course, an intermediate method therebetween is present. For example, a method in which one input pixel is assigned to a plurality of components (four (2×2) components in FIG. 7B) of the threshold value matrix, has been proposed. Therefore, no essential difference is present between the above methods, and the dither method, the density pattern method, and a intermediate method will be called a dither method.

In the dither methods, since an image output is produced as bi-level data, it is constituted only by white or black, i.e., "0" or "1", and it is impossible to control the density of an image. However, various image output apparatuses, e.g., a laser beam printer, an ink-jet printer, a CRT device, and the like, are used. In this case, these output apparatuses respectively have their unique output characteristics, and an output density may often vary using the same bi-level signal.

For example, in a laser beam printer, on/off operation of a laser beam onto a photosensitive drum is controlled so as to form an electrostatic latent image, and the latent image is developed, thereby obtaining a visible image. In this case, the potential of a latent image changes in accordance with an ON time of the laser beam. The ON time and the potential have a nonlinear relationship, and the potential and a developing density also have a nonlinear relationship. Since the laser beam printer alone poses such many variation factors, outputs from different output apparatuses vary widely, and an output reproduced image is often considerably different from an expected one using the same bi-level signal. In particular, this is prominent when an image data bi-level processing means is provided only to a controller (e.g., a host computer) outside the output apparatus, and a plurality of output apparatuses reproduce an image in response to the same bi-level signal from the controller. This applies not only to the bi-level image signal, but also to a multi-level signal, e.g., a four-level signal, received from the controller.

SUMMARY OF THE INVENTION

It is an object of the present invention to eliminate the above-mentioned drawbacks.

It is another object of the present invention to improve an image processing apparatus.

It is still another object of the present invention to provide an image processing apparatus which can provide a high-quality reproduced image.

It is still another object of the present invention to provide an image processing apparatus which can provide a good reproduced image with a simple arrangement.

It is still another object of the present invention to provide an image processing apparatus which reproduces a high-quality image using compressed pixel data.

It is still another object of the present invention to provide an image processing apparatus which facilitates density control of a reproduced image.

It is still another object of the present invention to provide an image processing apparatus which can accurately reproduce an original image.

It is still another object of the present invention to provide an image output apparatus which can provide a high-quality reproduction output with a small data volume.

It is still another object of the present invention to improve an image processing apparatus comprising an image identification function.

The above and other objects of the present invention will be apparent from the following description and appended claims taken in conjunction with the accompanying drawings.

BRIEF DESCRIPTION OF THE DRAWINGS

FIG. 3 is a detailed block diagram of a multilevel processor 4;

FIG. 4 is a detailed block diagram of a PWM circuit 5;

FIG. 8 is a block diagram showing the basic arrangement according to a third embodiment of the present invention;

FIG. 9 is a circuit diagram of the third embodiment;

FIGS. 17a to 17d are views for explaining the dither method and the multi-level method;

FIGS. 18a and 18b are views for explaining a primary differentiation filter;

DETAILED DESCRIPTION OF THE PREFERRED EMBODIMENT

Preferred embodiments of the present invention will now be described in detail with reference to the accompanying drawings.

Figure 1:
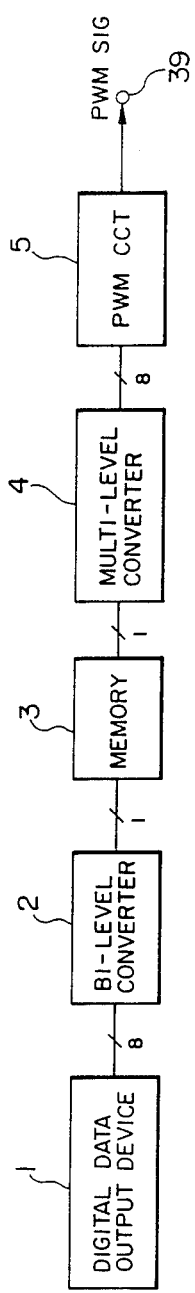
FIG. 1 is a block diagram of an image processing apparatus according to a first embodiment of the present invention.

FIG. 1 is a circuit diagram of an image processing apparatus according to a first embodiment of the present invention. Referring to FIG. 1, a digital data output device 1 A/D converts image data from a CCD sensor or a video camera (neither are shown), and outputs digital data of a predetermined number of bits (in this embodiment 8 bits). A bi-level processor 2 performs halftone processing for 8-bit pixel data output from the output device 1 using the systematic dither method or the average error minimization method, and compressed it to data having 1 bit per pixel. A memory 3 comprising a RAM or an electronic file stores a predetermined volume of bi-level data (1-bit data) output from the bi-level processor 2. A multi-level processor 4 converts the bi-level data output from the memory 3 into multi-level data having 8 bits per pixel. The multi-level data output from the multi-level processor 4 is input to a PWM (pulse width modulation) circuit 5. The operation of this embodiment will now be described. Data consisting of 8 bits per pixel output from the output device 1 is converted to bi-level data consisting of 1 bit per pixel, and is stored in the memory 3.

The bi-level data output from the memory 3 is input to the multi-level processor 4, and is converted again to multi-level data consisting of 8 bits per pixel. The converted data is then transferred to the PWM circuit 5.

The PWM circuit 5 performs pulse width modulation processing for the input 8-bit pixel data, and outputs it to a terminal 39 as a PWM signal. Note that numbers on respective lines in FIG. 1 represent the numbers of bits, and this also applies to FIGS. 3, 4, and 6.

The multi-level processor 4 will be described in more detail. FIG. 3 is a detailed block diagram of the multi-level processor 4. As shown in FIG. 3, bi-level data of "0" (white) or "1" (black), which is output from the memory 3 and is input to a terminal 6, is converted to 8-bit data by an 8-bit converter 7.

Data 0→Data 00

Data 1→Data FF

The converted 8-bit data is sequentially stored in a buffer memory 8 consisting of two lines (when one line is used for a write mode, the other one is used for a read mode) or several lines. The data stored in the buffer memory 8 is read out and is subjected to spatial filter processing by a smoothing circuit 9. As a spatial filter, a one-dimensional or two-dimensional spatial filter can be used, and a weighted averaging filter, a Gaussian filter, or a composite filter for averaging and edge emphasis is preferable. The spatial filter can be selected from a plurality of filters in accordance with image data to be processed. If bi-level data input to the multi-level processor 4 is obtained by various algorithms, one of several spatial filters can be appropriately selected, so that optimal multi-level data can be obtained from any bi-level data.

Multi-level data output from the smoothing circuit 9 is input to the PWM circuit 5 through a terminal 10.

The PWM circuit 5 will now be described in detail. FIG. 4 is a detailed block diagram of the PWM circuit 5. The multi-level data output from the multi-level processor 4 is converted to an analog signal by a digital-to-analog (D/A) converter 11, and the data for each pixel is sequentially input to one input terminal of a comparator 12. A pattern signal generator 13 produces a triangular wave signal 56 in a given cycle, e.g., for each predetermined number of pixels of the digital data, and inputs it to the other input terminal of the comparator 12.

Master clocks 52 generated from an oscillator (master clock generator) 15 are counted down to, e.g., a ¼ cycle by a timing signal generator 14, so as to be converted to pixel clocks 51, in synchronism with an H-SYNC signal 55 which is generated from an H-SYNC signal generator 16 for each line. The pixel clocks 51 serve as transfer clocks for transferring the pixel data, and as latch timing clocks for the D/A converter 11. The image processing apparatus of this embodiment is applied to a laser beam printer. Therefore, the H-SYNC signal 55 corresponds to a known BD (beam detect) signal indicating a scan position of a beam.

The comparator 12 compares levels of an analog image signal 53 and the triangular wave signal 56, and outputs a PWM signal 39. The PWM signal 39 is input to a modulator (e.g., a laser driver 40 shown in FIG. 2). A laser beam is turned on or off in accordance with the pulse width, and a halftone image is formed on a recording medium (a photosensitive drum 45 shown in FIG. 2).

Figures 5, 6:
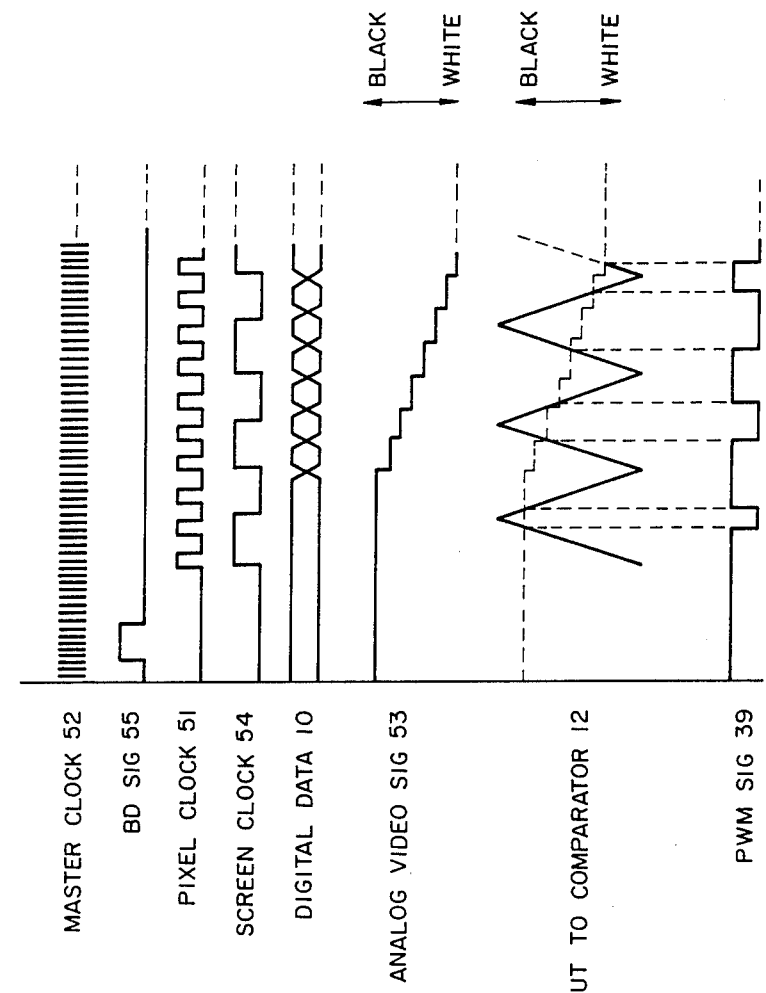
FIG. 5 is a timing chart for explaining signal waveforms of respective portions of the PWM circuit shown in FIG. 4.
FIG. 6 is a view showing a second embodiment of the present invention.
Figure 7A:
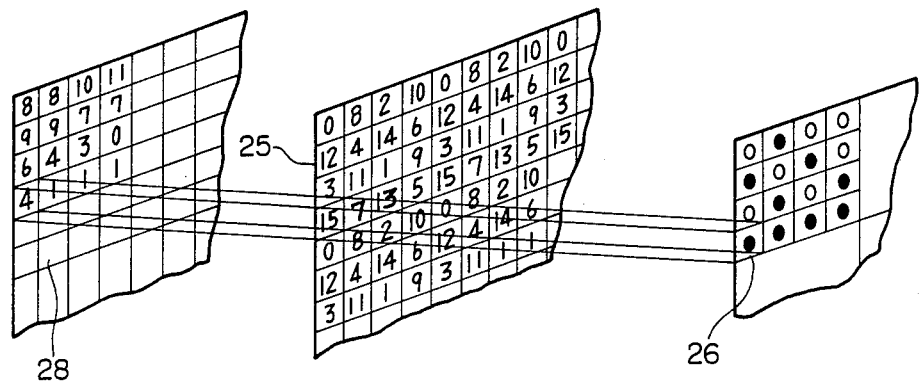
FIGS. 7A and 7B are views for explaining the principle of the conventional dither method and density pattern method.
Figure 7B:
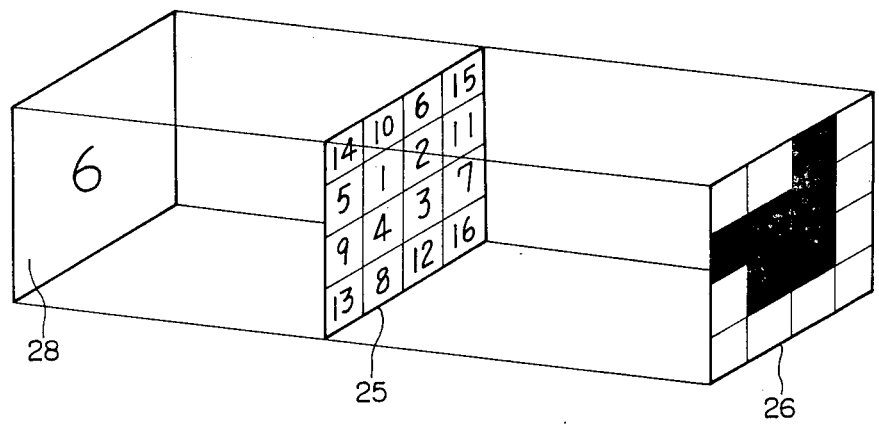

FIG. 5 is a timing chart for explaining signal waveforms in the respective portion of the multi-level processor 5 shown in FIG. 4. Referring to FIG. 5, the master clocks 52 correspond to outputs from the oscillator 15, and the BD signal 55 corresponds to the H-SYNC signal, as described above. The pixel clocks 51 are obtained by counting down the master clocks 52 by the timing signal generator 14. More specifically, the pixel clocks 51 are obtained by counting down the master clocks 52 to a ¼ cycle by the timing signal generator 14 in synchronism with the H-SYNC signal. Screen clocks 54 are obtained by counting down the pixel clocks 51 to a ⅓ cycle by the timing signal generator 14. More specifically, each screen clock has a cycle corresponding to the total duration of three pixel clocks 51, and is synchronous with the BD signal. The screen clocks 54 serve as a sync signal for generating the triangular wave signal 56, and are input to a pattern signal generator 13. Digital data input to the terminal 10 is multi-level (8-bit) data obtained by the multi-level processor 4. An analog video signal 53 is image data which is D/A converted by the D/A converter 11. As can be seen from FIG. 5, each pixel data of analog level is generated in synchronism with the pixel clocks 51. As shown in FIG. 5, the higher the analog level becomes, the higher the density becomes.

The triangular wave signal 56 as the output from the pattern signal generator 13 is generated in synchronism with the screen clocks 54 as indicated by the solid line of "INPUT TO COMPARATOR 12" in FIG. 5, and is input to the comparator 12. The broken line in FIG. 5 indicates image data which is converted to analog image data by the D/A converter 11. This analog image data is compared with the triangular wave signal 56 from the pattern signal generator 13 by the comparator 12, and is converted to pulse-width modulated bi-level data, as indicated as the PWM output 39.

In signal processing in this embodiment, after the multi-level digital data 10 is temporarily converted to analog image data, the image data is compared with the triangular wave signal 56 having a predetermined cycle, thereby allowing almost continuous pulse-width modulation. Therefore, a high-gradation image output can be obtained.

According to this embodiment, the screen clocks 54 synchronous with the H-SYNC signal 55 are generated using the master clocks 52 which have a frequency (e.g., a frequency 12 times that of the triangular wave signal) higher than the frequency of the sync signal for generating a pattern signal (e.g., the triangular wave signal). Therefore, drift of the pattern (triangular wave) signals 56 generated from the pattern signal generator 13 (e.g., deviation between the pattern signals for the first and second lines) can be 1/12 the pattern signal cycle. Therefore, since gradation information is pulse-width modulated using the pattern signals with less drift, a high-quality reproduced image can be obtained.

As described above, 8-bit multi-level image data is converted to bi-level data and is stored in the memory 3. and 8-bit multi-level data is reproduced from the bi-level data read out from the memory 3 and is further pulse-width modulated. Thus, a high-quality reproduction output can be obtained using a small-capacity memory.

Figure 2:
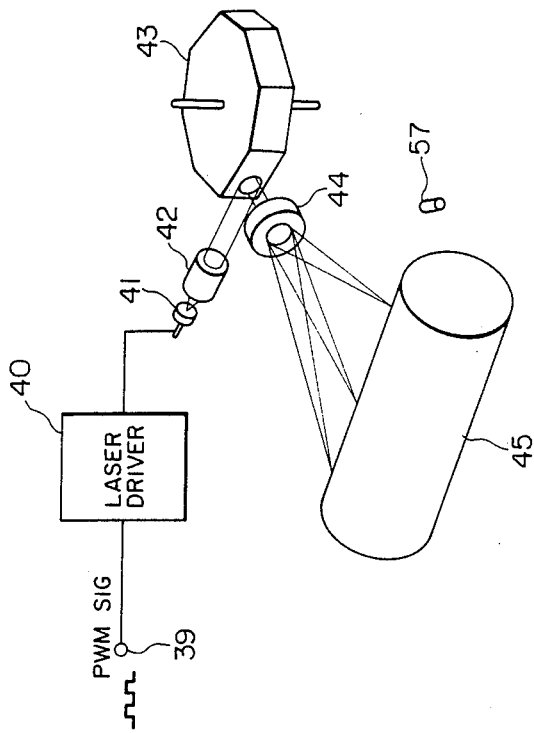
FIG. 2 is a diagram schematically showing a laser printer to which the present invention can be applied.

FIG. 2 schematically shows a laser beam printer to which the present invention can be applied. Referring to FIG. 2, a terminal 39 receives the PWM signal shown in FIG. 1. The PWM signal input to the terminal 39 is input to the laser driver 40. The laser driver 40 drives a semiconductor laser 41 in accordance with the PWM signal, so as to modulate a beam. A light beam emitted from the semiconductor laser 41 is collimated by a collimator lens 42, and is deflected by a rotary polyhedral mirror 43. Then, the light beam is scanned on a photosensitive drum 45 by means of an fθ lens 44. An optical image formed on the photosensitive drum 45 forms an electrostatic latent image, and an image output is performed by a normal process as in a copying machine. A beam detector 57 detects the scanning position of the light beam, and the BD signal 55 is formed based on the output from the beam detector 57.

FIG. 6 is a block diagram of an image processing apparatus according to a second embodiment of the present invention. The same reference numerals in FIG. 6 denote the same parts as in FIG. 1, and a detailed description thereof will be omitted.

FIG. 6 shows a case wherein image data is transferred through a communication line as in a facsimile system, and is output through a printer. Image data (8 bits) output from a digital data output device 1 is converted to bi-level data by a bi-level processor 2, and is input to an encoder 17. The encoder 17 compresses the input bi-level data and transfers it onto a communication line 18. The transferred data is converted to the bi-level data by a decoder 19 on the reception end, and is still converted to multi-level data (8 bits) by a multi-level processor 4. Thereafter, the multilevel data is converted to a substantially continuous PWM signal by a PWM circuit 5, as described above, and is output to a printer. With this arrangement, a data volume upon communication can be greatly reduced, and a high-resolution image signal can be transferred in a short period of time. On the reception end, the decoded bi-level data is converted to the multi-level data, and the multi-level data is output to the printer as the PWM signal. Therefore, a high-quality output can be obtained.

In this embodiment, bi-level data (1 bit) is converted to multi-level data (8 bits). However, three-level data (2 bits) can be converted to multi-level data (8 bits). In this case, data "0" (white), "½" (gray), and "1" (black) are respectively converted to data "00", "80", and "FF" by the multi-level processor 4. In this case, the memory capacity is slightly increased. However, an output of higher quality can be obtained.

As described above, input image data of predetermined number of bits is converted to bi-level data so as to store it in a memory or to transfer it through a communication line. Thereafter, the bi-level data is converted to multi-level data of a predetermined number of bits so as to produce a PWM signal, thereby obtaining an image output. Therefore, the following effects can be obtained.

1. Even if a memory capacity and a data volume upon communication are small, a high-quality output can be obtained.

2. Data which is converted to bi-level data by various algorithms can be processed, and an output of higher quality can be obtained.

A third embodiment of the present invention will now be described. FIG. 8 shows the basic arrangement of the third embodiment.

An image output system including an image output device according to the third embodiment shown in FIG. 8 comprises an image data output device 100 for outputting digital image data 101, and a plurality of image output devices 200, ..., 201 which are connected to the image data output device 100, and output digital image data 100 as an image. The digital image data 101 is, for example, a bi-level signal. Each image output device has a multi-level converter 202 for converting the digital image data 101 into multi-level density data 202a, a density converter 203 for density-converting the multi-level density data 202a, a bi-level converter 204, for converting density-converted multi-level density data 203a into bi-level data, and the like. The image output devices 200 can be different output devices such as a laser beam printer, an ink-jet printer, and the like.

With the above arrangement, even if the digital image data 101 is a bi-level signal which cannot represent a gradation density by one pixel, it is converted to the multi-level density data 203a first and then to bi-level data by the bi-level converter 204. Therefore, if the output devices 200 are different output devices, density control is enabled in the output devices so as to obtain a desired final output density.

The image output device 200 shown in FIG. 8 has the arrangement when the present invention is applied to a laser beam printer. As described above, after the input digital image data 101 is subjected to conversion processing, such as multi-level conversion, density conversion, bi-level conversion, and the like, its bi-level signal is input to a laser driver 240, and a laser beam is focused on a photosensitive drum through an optical system 241. The multi-level conversion, density conversion, and the like will be described with reference to FIGS. 9, 12, 13 and 15, and the bi-level conversion will be described with reference to FIGS. 9 and 10. The optical system will be described with reference to FIG. 14. Note that the multi-level converter 202 shown in FIG. 8 corresponds to a multi-level processor 109 shown in FIG. 9, the density converter 203 corresponds to an LUT 113, and the bi-level converter 204 corresponds to a D/A converter 102, a comparator 104, and the like. The optical system 241 shown in FIG. 8 corresponds to a semiconductor laser 131, the collimator lens 132, and the like shown in FIG. 14.

FIG. 9 is a block diagram of processing for converting dither data into a PWM output signal 104a. Multi-level conversion of input digital image data (dither data 110) is performed by a multi-level processor 109, and density conversion is performed by the LUT 113. Note that dither data indicates an image signal which has been subjected to dither processing (halftone processing) in a broad sense, as described above, and is normally a bi-level signal. In this embodiment, bi-level conversion by a PWM (pulse-width modulation) method which has been filed by the present applicant (e.g., U.S. application Ser. No. 051,154, filed on May 18, 1987, which is a continuation of Ser. No. 931,941, filed on Nov. 19, 1986, now abandoned, which is a continuation of Ser. No. 765,938, filed on Aug. 15, 1985 and the like) is adopted.

(Multi-level Conversion and Density Conversion)

A description will be made with reference to FIG. 9. Dither data (bi-level data) 110 which is data "0" or "1" is converted to 8-bit BCD indication multi-level data 109a by the multi-level processor 109 as follows:

Data "0"→Data "0"

Data "1"→Data "FF"

Such conversion can be easily realized by, e.g., a ROM (Read-Only Memory). Thereafter, the 8-bit multi-level data 109a is input to the look-up table (LUT) 113 for density conversion, and is converted to the following 8-bit density correction data 113a. In this case, since the data indicate only two states of "00" and "FF", the data are converted to two arbitrary 8-bit data "A" and "B".

Data "00"→Data "A"

Data "FF"→Data "B"

Figure 12:
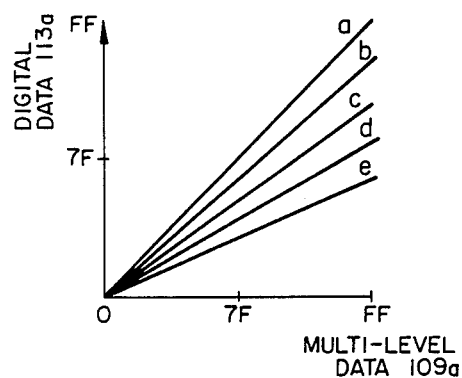
FIGS. 12 and 13 are graphs showing a density conversion characteristic in the third embodiment.
Figure 13:
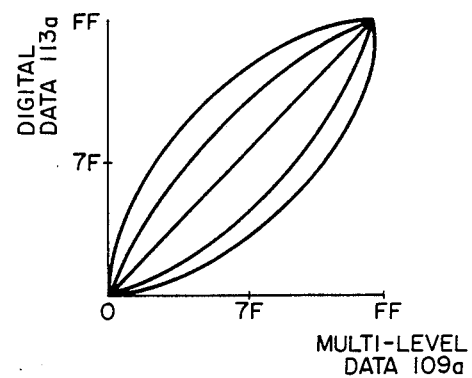

Since the bi-level dither data 110 is converted to the multi-level data in this manner, density conversion, i.e., density control is enabled, and is performed by the LUT 113 in accordance with desired density conversion characteristics. As will be described later, the density conversion characteristics are as shown in FIG. 12 or 13. These characteristics are selected in accordance with a select signal 115a from a select signal generator 115. Density conversion will be described later in more detail.

(Bi-level Conversion)

The output signal 113a from the LUT 113 is converted to analog data by a digital-to-analog (D/A) converter 102, and each analog pixel data is sequentially input to one input terminal of a comparator 104 one by one. A pattern signal generator 103 generates a pattern signal 103a having a triangular waveform in a cycle corresponding to a predetermined number of pixels of the dither data 110, and the pattern signal 103a is input to the other input terminal of the comparator 104. The waveform of the pattern signal can be a sine waveform, sawtooth waveform, and the like. In the laser beam printer of this embodiment, the pattern signal 103a preferably has the same cycle as the pixel width. However, for the sake of simplicity, the pattern signal 103a has a cycle corresponding to a three-pixel width, as shown in the timing chart of FIG. 10.

The pattern signal 103a input to the comparator 104 will now be described. An oscillator (master clock generator) 105 produces master clocks 105a. The master clocks 105a are counted down to a ¼ cycle in synchronism with an H-SYNC signal 114 for each line generated from an H-SYNC generator 114 so as to be converted to pixel clocks 107a. The pixel clocks 107a are used as transfer clocks for image data, and latch timing clocks for the D/A converter 102. Note that the H-SYNC signal can be internally generated or can be externally supplied. Since this embodiment is applied to the laser beam printer, the H-SYNC signal corresponds to a known beam detect (BD) signal. A timing signal generator 107 also produces screen clocks 107b. Each screen clock 107b has a cycle corresponding to an integer multiple of the master clock 105a. In this embodiment, the screen clock 107b has a cycle three times that of the pixel clock 107a. The screen clocks 107b are input to the pattern signal generator 103. The pattern signal generator 103 comprises an integrator consisting of a capacitor, a resistor, and the like, and produces the pattern signal 103a of, e.g., a triangular waveform.

The comparator 104 compares the levels of the analog image signal 102a and the pattern signal 103a, and outputs a PWM signal 104a. The PWM signal 104a is input to a modulator for modulating a laser beam (e.g., a laser driver 240 shown in FIG. 8 or 14). The laser beam is turned on or off in accordance with the pulse width, and a halftone image is formed on a recording medium (a photosensitive drum 135 in FIG. 14).

In this embodiment, the screen clocks 107b synchronous with the H-SYNC signal 114a are generated using the master clocks 105a which have a frequency (e.g., a frequency 12 times that of the triangular wave signal) higher than the frequency of the sync signal for generating a pattern signal (e.g., the triangular wave signal). Therefore, drift of the pattern (triangular wave) signals 103a generated from the pattern signal generator 103 (e.g., deviation between the pattern signals for first and second lines) can be 1/12 the pattern signal cycle. Therefore, since gradation information is pulse-width modulated using the pattern signals with less drift, a high-quality reproduced image can be obtained.

Figure 10:
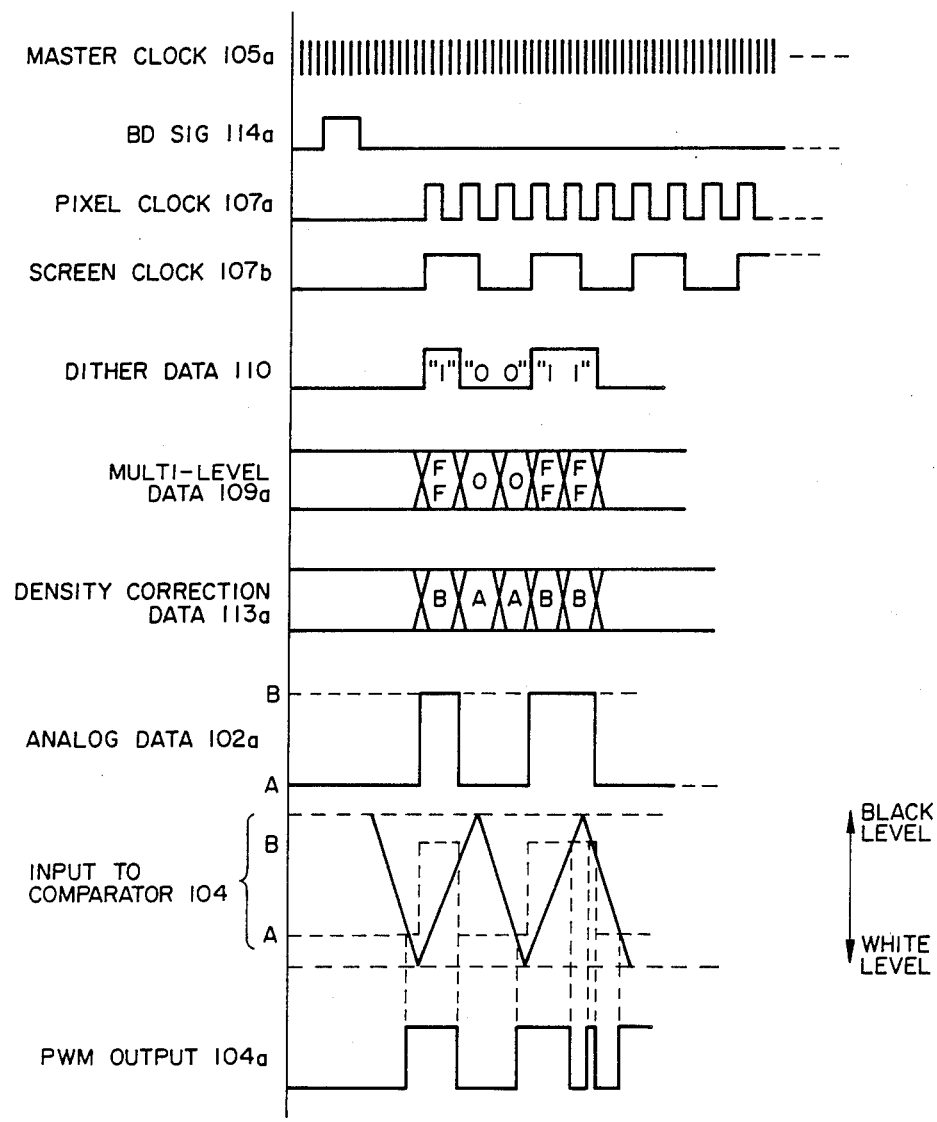
FIG. 10 is a timing chart for explaining the operation of the third embodiment.

FIG. 10 is for explaining signal waveforms of the respective portion in the apparatus shown in FIG. 9. Referring to FIG. 10, the master clocks 105a correspond to the outputs from the oscillator 105, and the BD signal 114a corresponds to the H-SYNC signal described above. The pixel clocks 107a are obtained by counting down the master clocks 105a from the oscillator 105 by the timing signal generator 107. The screen clocks 107b are obtained by the timing generator 107. The screen clocks 107b have a cycle corresponding to the total duration of three pixel clocks 107a. The screen clocks 107b are used for generating the pattern signal 103a, and are input to the pattern signal generator 103.

Assume that data "10011" is input as the dither data 110. By the multi-level conversion, the resultant multi-level data 109a is (FF)$_H$ (00)$_H$(00)$_H$(FF)$_H$(FF)$_H$. Note that "( )$_H$" represents hexadecimal notation. Then, the digital density correction data 113a is converted to data "BAABB" by the LUT 113 in accordance with the above-mentioned density conversion.

Data "00"→Data "A"

Data "FF"→Data "B"

The analog data 102a is image data which is D/A converted by the D/A converter 102. In this case, a high density value corresponds to data "B", and a low density value corresponds to data "A". As shown in FIG. 10, the higher the analog level becomes, the higher the density becomes.

The pattern signal 103a as the output from the pattern signal generator 103 has a triangular waveform, as indicated by the solid line of "INPUT TO COMPARATOR 104" in FIG. 10, and is compared with the analog data 102a. The comparison result is pulse-width modulated bi-level data, and is the PWM output signal 104a.

In this manner, the bi-level data 110 input to the image output device of this embodiment is subjected to conversion processing to be converted to multi-level data. After density correction, the multi-level data can be converted to a desired pulse width. Therefore, density control can be performed by the output device.

(Output)

Figures 14, 15:
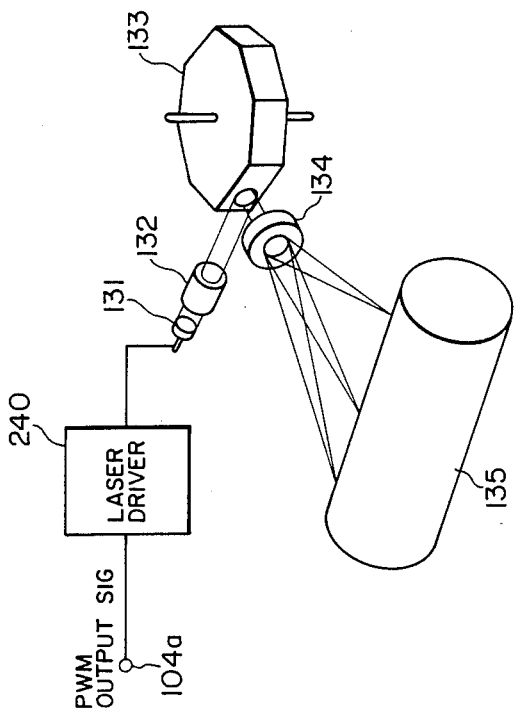
FIG. 14 is a diagram showing an output section of a laser beam printer according to the third embodiment.
FIG. 15 is a memory map of a look-up table.

As shown in FIG. 14, the PWM output signal 104a drives the laser driver 240, and pulse-width modulates the semiconductor laser 131 to emit a laser beam. The laser beam emitted from the semiconductor laser 131 is collimated by the collimator lens 132, is deflected by a rotary multi-surface mirror 133, and is scanned on the photosensitive drum 135 by an fθ lens 134. An optical image formed on the photosensitive drum forms an electrostatic latent image, and an image output is performed by a normal process of a copying machine.

In signal processing of this embodiment, dither data is temporarily converted to analog image data, and thereafter, the analog image data is compared with the triangular wave pattern signal 103a having a predetermined cycle, thereby allowing variable pulse-width modulation. Therefore, an image output whose density can be controlled can be obtained.

(Image Output System)

Figure 11:
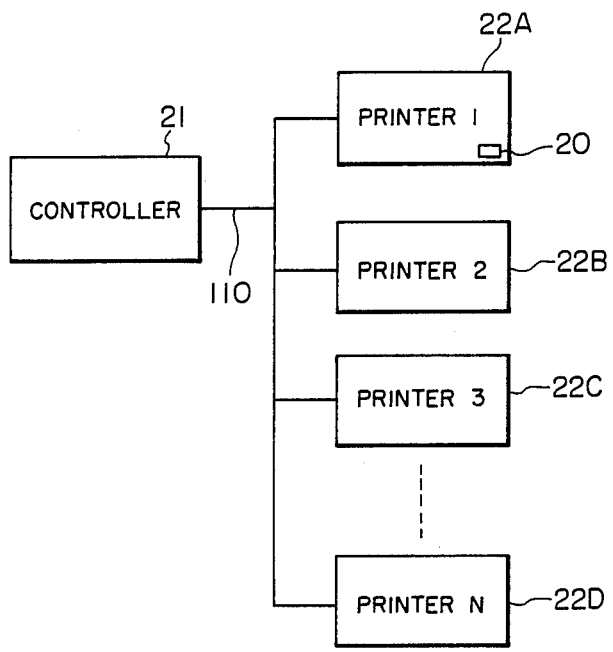
FIG. 11 is a block diagram of an image output system according to a fourth embodiment of the present invention.

FIG. 11 shows the arrangement in which the present invention is applied to an image output system FIG. 11 exemplifies a system for causing a plurality of printers (22A to 22D) to output an identical image in response to an output signal from a single controller (host computer) 21. The printers (22A to 22D) respectively comprise the above-mentioned image output devices. The controller 21 outputs identical dither data 110 to the printers. In this case, there is a problem of different output densities of the printers. More specifically, if setting conditions of the respective printers are different, and a maximum density value Dmax is different for each printer, output image densities differ with respect to identical data.

In dither data itself, density control cannot be performed, and in a printer, a density is controlled by, e.g., setting a potential on the photosensitive drum 135. However, in the embodiment shown in FIG. 11, the output densities of the printers can be controlled by setting or adjusting the LUT 113 shown in FIG. 9. The density control characteristics are selected by select dials 120 of the respective image output devices (22A to 22D) shown in FIG. 11. One of the density correction characteristics shown in FIGS. 12 and 13 is selected by the select dial 120.

Each printer has a circuit as shown in FIG. 9. For example, the LUT 113 comprising, e.g., a ROM has a plurality of tables (a to e), as shown in FIG. 15. In FIG. 15, the table a is allocated from address $(00)_H$ to $(FF)_H$, the table b is allocated from address $(100)_H$ to $(1FF)_H$, the table c is allocated from address $(200)_H$ to $(2FF)_H$, and the table d is allocated from address $(300)_H$ to $(3FF)_H$, ... FIG. 12 shows the density conversion characteristics obtained by the conversion tables of the LUT 113. The LUT 113 has conversion characteristics where the multi-level data 109a is plotted along the ordinate and the digital data 113a is plotted along the abscissa, as shown in FIG. 12. Referring back to FIG. 9, when an operator of the output devices (22A to 22D) operates the select dial 120 to select an appropriate density conversion characteristics, the select signal generator 115 produces the select signal 115a in accordance with the dial position. In FIG. 12, since five tables are provided, the select signal 115a can be a 3-bit signal. The LUT 113 receives the select signal as an upper address (an MSN address in FIG. 15), and the multi-level data 109a as a lower address, and outputs the digital data 113a in accordance with the table shown in FIG. 15. In this manner, when a desired curve is selected by the select dial of each printer, an output density can be maintained uniform.

(Fourth Embodiment)

In the above embodiment, the case of bi-level data input has been described. However, the circuit shown in FIG. 9 can process multi-level data input (three-level, four-level, ...). In this case, the multi-level level processor 109 receives "0", "½", and "1" in the case of, e.g., three-level data, and converts them as follows:

Input "0" Output "00"

Input "½"→Output "7F"

Input "1"→Output "FF"

The following processing can be performed in the same manner as in bi-level conversion. The LUT 113 can be linearly changed as shown in FIG. 12. Only intermediate data (corresponding to ½) of the multi-level data 109a can be converted. This can be realized by preparing an LUT shown in FIG. 13.

A fifth embodiment of the present invention will be described.

Figure 16:
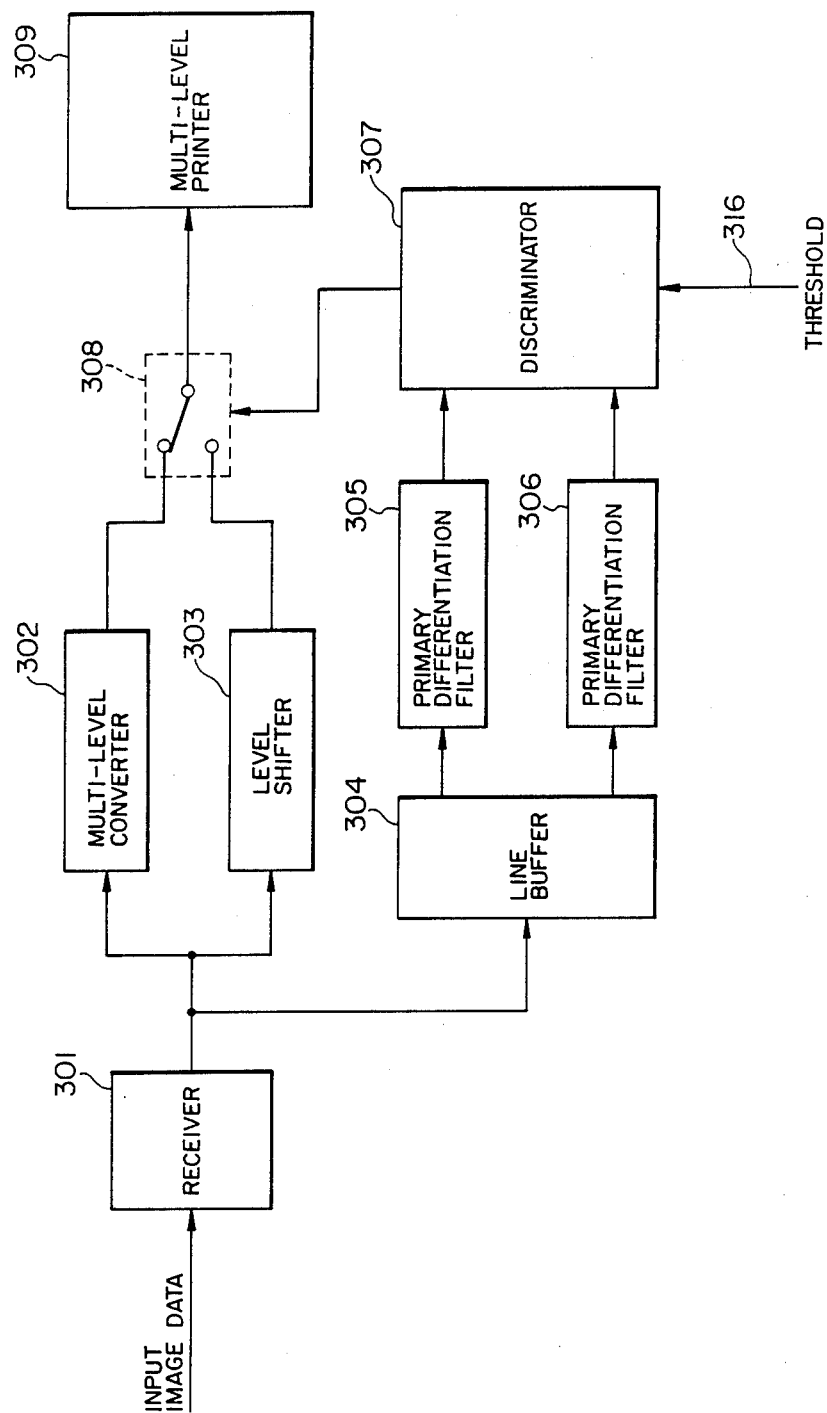
FIG. 16 is a system block diagram of an image processing apparatus according to a fifth embodiment of the present invention.

FIG. 16 is a system block diagram of an image processing apparatus according to a fifth embodiment of the present invention A receiver 301 receives pixel data (bi-level data) from an external device. A multi-level processor 302 converts input bi-level data (1-bit data) into 16 density levels (4-bit data) in the fifth embodiment, and outputs it. A level shifter 303 level-shifts the input bi-level data into a maximum density level or a minimum density level (both are 4-bit data) in a printer 309. A line buffer memory 304 can store several lines of input image data which is obtained through the receiver 301. Primary differentiation filters 305 and 306 calculate a feature amount of pixel of interest data from a plurality of pixel data around the pixel of interest data (in this embodiment, a matrix region of the pixel of interest data). A discriminator 307 discriminates, based on the feature amounts input from the primary differentiation filters 305 and 306, whether the input pixel of interest corresponds to half-tone image information such as a photograph or unitone image data such as a character. The discriminator 107 outputs an instruction to a selector 308 in accordance with the discrimination result, thereby switching the selector 308. A multi-level printer 309 can perform gradation recording by one pixel The multi-level processor 302 converts data of one pixel (pixel of interest) based on input bi-level data into multi-level data (e.g., four bits per pixel). In this embodiment, for data which is bi-level converted in accordance with a 4×4 dither matrix shown in FIG. 17a, bi-level data adjacent to the central pixel in a 4×4 dot region are added to calculate an average density in this region, and the average density is assigned to the central pixel data (equation 1).

$$\text{Multi-level data} = \text{maximum density} \times N/(m \times m) \quad (1)$$

Where N is the total number of "1"s in bi-level data, and m=4 in this embodiment.

Therefore, $$\text{Maximum density} \times N/(4 \times 4)$$

Thus, data of 16 (=4×4) gray levels can be reproduced as multi-level data.

For example, as shown in FIG. 17b, when pixel data of 4×4 dots including a pixel of interest is bi-level converted using the dither matrix shown in FIG. 17a, image data shown in FIG. 17c is obtained. When image data shown in FIG. 17c is input through the receiver 301, the number of "1"s in FIG. 17c is counted (in this case, eight). Therefore, from equation 1, $$\text{Maximum density} \times 8/(4 \times 4) = \text{maximum density} \times \tfrac{1}{2}$$

When the number of "1"s is eight, a signal representing a density level half the maximum density (or eighth density level in the 16 gray levels) is output to the multi-level printer 309. This case is shown in FIG. 17d.

The level shifter 303 converts bi-level data into the maximum or minimum density level of the multi-level printer. The outputs from the multi-level processor 302 and the level shifter 303 are switched by the selector 308. The selector 308 is controlled by the control signal from the discriminator 307, and the switched density level signal is output to the multi-level printer, thereby forming a visible image.

The discrimination method of the discriminator 307 will be described below.

FIGS. 18a and 18b show the primary differentiation filters 305 and 306 used in this embodiment. FIG. 18a is used for vertical line detection, and FIG. 18b is used for horizontal line detection. As the size of the primary differentiation filters 305 and 306, if a matrix of $(2 \times M+1) \times M$ in the vertical direction and $M \times (2 \times M+1)$ in the horizontal direction is selected, line pattern detection which is not easily affected by the dither pattern is enabled.

Figure 19A:
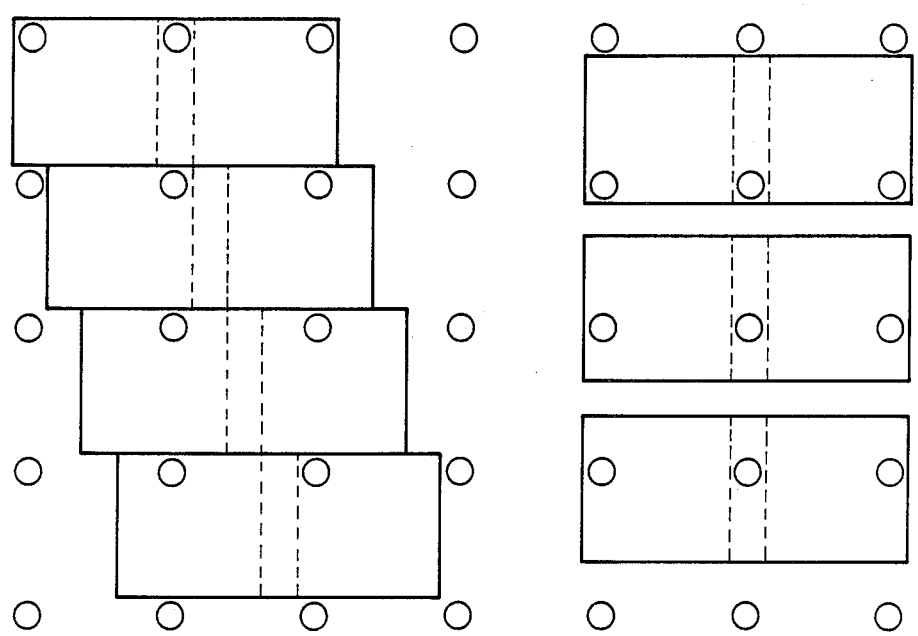
FIGS. 19a and 19b are views for explaining the operation of the primary differentiation filter for a bi-level image.

FIG. 19a shows the effect of the primary differentiation filter on the dither halftone portion of a bi-level image. In FIG. 19a, a mark "o" represents a "1" (black) dot. Pixels have one-to-one correspondence with minus and plus terms of the filter, and the absolute value of the primary differentiated value becomes zero. In a dither halftone image in which a local change in density is small, a difference in the numbers of pixels corresponding to minus and plus terms is small, and as a result, the absolute value of the primary differentiated value is also small.

Figure 19B:
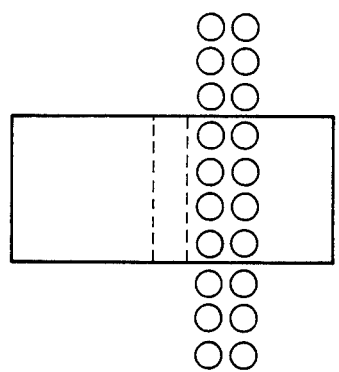

FIG. 19b shows the effect of the primary differentiation filter in a line pattern and a character/symbol portion of a bi-level image. The difference in the numbers of pixels corresponding to the minus and plus terms of the filter becomes large, and hence, the absolute value of the primary differentiated value becomes large. Therefore, the primary differentiated value and an image have the following relationship.

When the absolute value of the primary differentiated value is small it is discriminated that the bi-level image is a dither halftone image.

When the absolute value of the primary differentiated value is large it is discriminated that the bi-level image is a character or line pattern.

Figure 20:
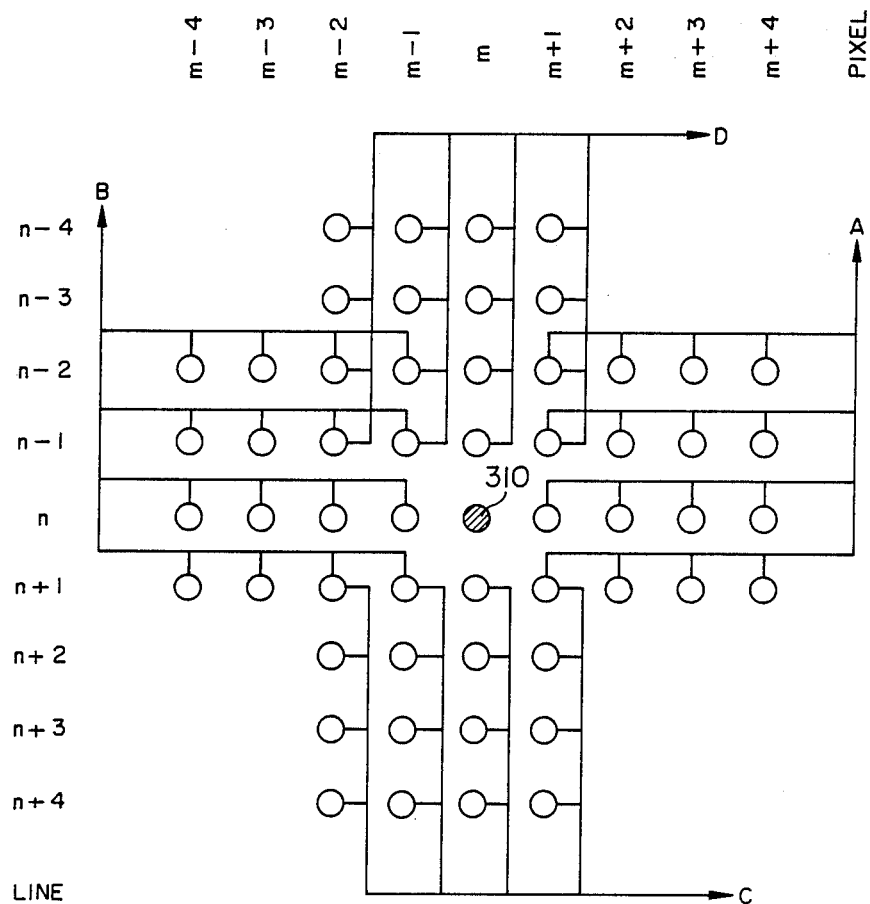
FIG. 20 is a view showing how image data is extracted for the primary differentiation.

FIG. 20 shows from which position image data is extracted for primary differentiation with reference to a hatched central pixel (pixel of interest) 310 (m,n). As for the filter shown in FIG. 18a, 16 pixels are extracted from each of matrices A and B. As for the filter shown in FIG. 18b, 16 pixels are extracted from each of matrices C and D.

Figure 21:
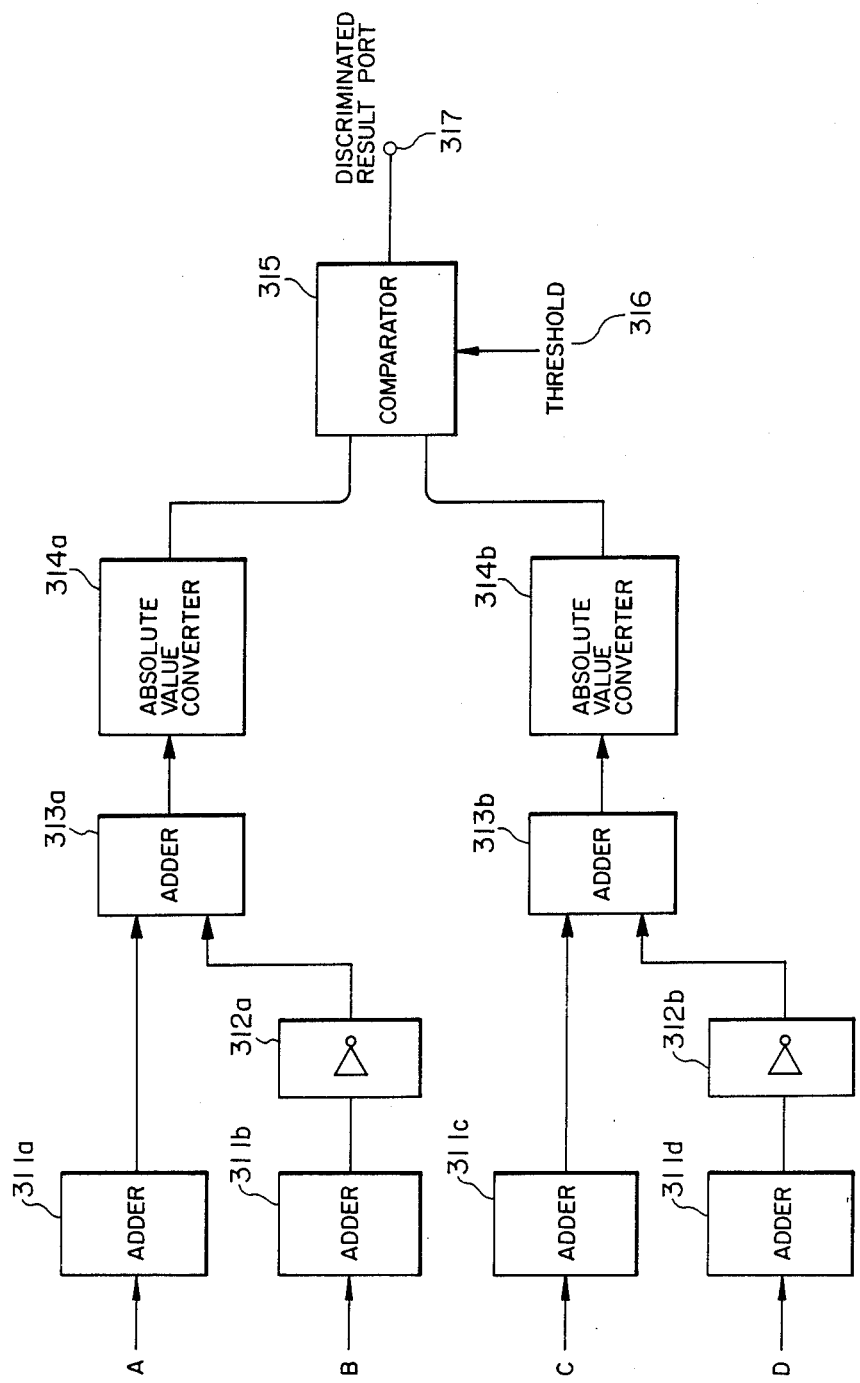
FIG. 21 is a view showing an internal arrangement of a discriminator.

As shown in FIG. 21, "1" pixels in pixel groups of the matrices A, B, C, and D are counted by adders 311a, 311b, 311c, and 311d. The count results of the matrices B and D are supplied respectively through inverters 312a and 312b in order to invert the signs of the count results, so that the differences respectively between the matrices A and C and between the matrices B and D are then calculated. The absolute values of the differences are calculated by absolute value converters 314a and 314b, and the results are supplied to a comparator 315. For example, if either a vertical or horizontal line is detected, a signal indicating that the selector 308 is switched to the level shifter 303 is supplied to a discriminated result port 317. In a known method, if a larger one of the two absolute values is larger than a given threshold value 316, the discriminated result corresponds to a line pattern.

In another known method, if the sum of the two absolute values is larger than the threshold value 316, a line pattern is determined. The selector shown in FIG. 16 is switched using this discriminated result.

The multi-level processor 302 and the level shifter 303 each have line buffers to be synchronized with the discriminator 307. Instead, a common line buffer can be used.

In the above description, hardware processing is made. A sixth embodiment for software processing will be described with reference to the flow chart shown in FIG. 22 and the block diagram shown in FIG. 23. In FIG. 23, a CPU 400 controls the entire apparatus. A ROM 401 stores the program corresponding to the flow chart shown in FIG. 22, and a RAM 402 is used for a work area of the CPU 400.

Figure 22:
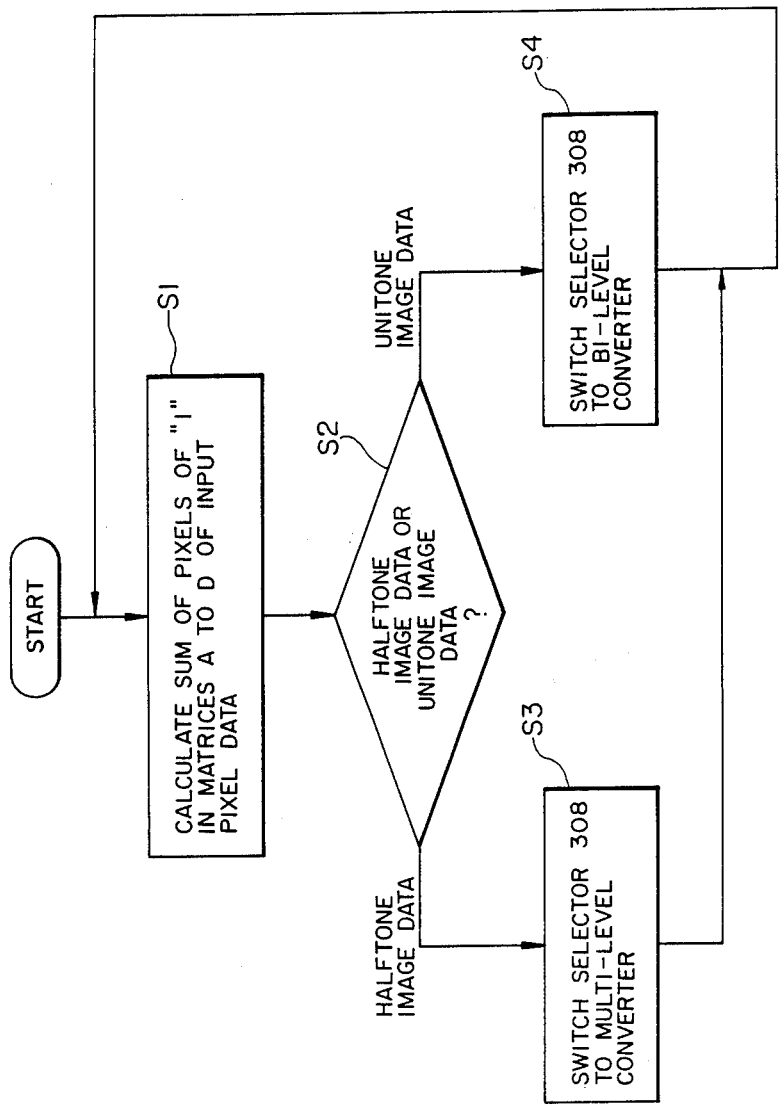
FIG. 22 is an operation flow chart of discrimination processing according to a sixth embodiment of the present invention.
Figure 23:
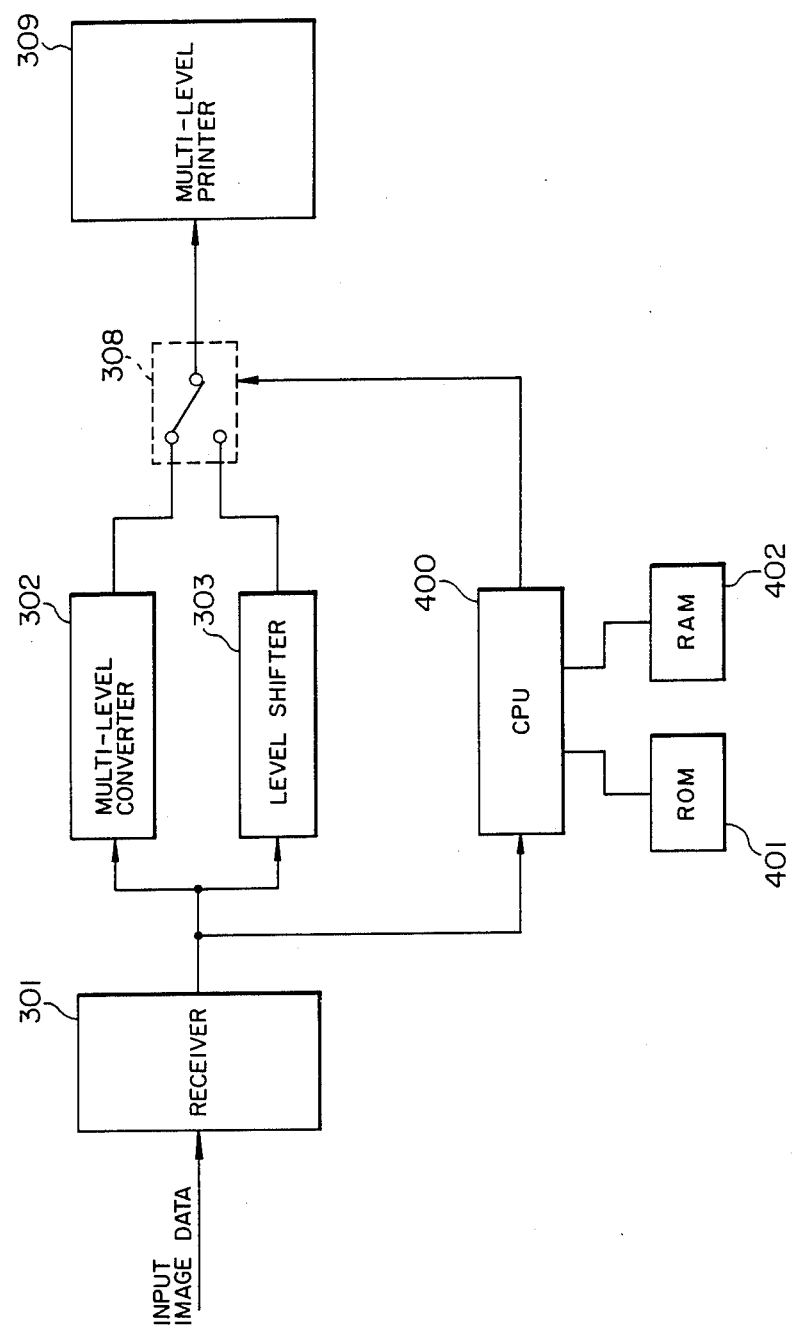
FIG. 23 is a system block diagram of the sixth embodiment.

FIG. 22 is the flow chart for switching processing of the selector 308 with respect to input image data. A description will be made with reference to this flow chart.

In step S1, the total number of "1"s in the matrices A, B, C, and D of input pixel data is counted. It is then discriminated in step S2 if pixel of interest data is a halftone image or a unitone image. In this case, one of the above-mentioned two methods is used as discrimination standard. If it is discriminated that the pixel of interest data is the halftone image, the flow advances to step S3, and an instruction for switching the selector 308 to the multi-level processor is output. Then, the flow returns to step S1. If it is discriminated in step S2 that the pixel of interest data is the unitone image, the flow advances to step S4, and an instruction for switching the selector 308 to the bi-level processor is output. Then, the flow returns to step S1. Thereafter, this processing is repeated, and the density levels of the pixel of interest data are sequentially output to the printer 309, thereby forming a visible image.

According to the present invention as described above, when image data is output to an apparatus for forming a visible image after multi-level conversion, it is discriminated if the input image information is halftone image information or unitone image information such as a character/symbol and a line pattern, and image data suited for the respective image information is output. Therefore, a high-quality image can be formed.

In the above embodiments, a $4 \times 9$ or $9 \times 4$ matrix is used for the description. The present invention is not limited to this.

In the above embodiments, the receiver 1 receives image data through a communication line. However, the present invention can be applied to a case wherein an image is scanned by a CCD and the like.

In FIGS. 16 and 23, input image data is 1-bit bi-level data, but can be 2-bit three-level data.

The present invention is not limited to the above embodiments, and various other changes and modifications may be made within the spirit and scope of the appended claims.

What is claimed is:

1. An image processing apparatus comprising:
   image data information means for generating m-bit halftone-processed image data;
   conversion means for converting the m-bit image data generated by said image data generation means into n-bit (n>m) image data; and
   pulse-width modulation signal generation means for processing the n-bit image data output from said conversion means and generatinq a pulse-width modulation signal.

2. An apparatus according to claim 1, wherein said pulse-width modulation signal generation means processes the n-bit image data using a pattern signal of a predetermined cycle, and generates the pulse-width modulation signal in accordance with the pattern signal.

3. An apparatus according to claim 2, wherein said pattern signal is a triangular wave signal.

4. An apparatus according to claim 1, wherein said pulse-width modulation signal generation means has analog pattern signal generation means for generating an analog pattern signal of a predetermined cycle, D/A conversion means for D/A converting the n-bit image data, and comparison means for comparing the analog pattern signal with an analog image signal output from said D/A conversion means and outputting the pulse-width modulation signal.

5. An apparatus according to claim 4, further comprising means for modulating a beam based on the pulse-width modulation signal and reproducing an image by means of the modulated beam, and means for generating a position signal indicating a scanning position of the modulated beam, said analog pattern signal generation means generating the analog pattern signal in synchronization with the position signal.

6. An image processing apparatus comprising:
image data generation means for generating m-bit image data;
conversion means for converting the m-bit image data generated by said image data generation means into n-bit (n>m) image data; and
pulse-width modulation signal generation means for processing the n-bit image data output from said conversion means and generating a pulse-width modulation signal,
wherein said image data generation means has halftone processing means for halftone processing input image data and outputting the m-bit image data, and memory means for storing the m-bit image data output from said halftone processing means.

7. An image processing apparatus comprising:
image data generation means for generating m-bit image data;
conversion means for converting the m-bit image data generated by said image data generation means into n-bit (n>m) image data, wherein said conversion means is adapted to produce the n-bit data having a selected one of a plurality of levels for m-bit image data having one level; and
pulse-width modulation signal generation means for processing the n-bit image data output from said conversion means and generating a pulse-width modulation signal.

8. An image processing apparatus according to claim 7, wherein said image data generation means generates 1-bit image data.

9. An image processing apparatus comprising:
image data generation means for generating m-bit image data;
conversion means for converting the m-bit image data generated by said image data generation means into n-bit (n>m) image data; and
pulse-width modulation signal generation means for processing the n-bit image data output from said conversion means and generating a pulse-width modulation signal,
wherein said conversion means has a converter for converting the m-bit image data generated by said image data generation means into the n-bit image data, and means for performing spatial filter processing with respect to the n-bit image data output from said converter.

10. An image processing apparatus comprising:
image data generation means for generating m-bit halftone-processed image data;
conversion means for converting the m-bit image data generated by said image data generation means into n-bit (n>m) image data; and
halftone process means for halftone processing the n-bit image data output from said conversion means.

11. An apparatus according to claim 10, wherein said conversion means has a plurality of characteristic conversion tables for outputting n-bit characteristic-converted image data, and any one of said plurality of tables is selectively used in accordance with a predetermined instruction signal.

12. An apparatus according to claim 10, wherein said halftone process means comprises pulse-width modulation signal generation means for processing the n-bit image data output from said conversion means and generating a pulse-width modulation signal.

13. An apparatus according to claim 12, wherein said pulse-width modulation signal generation means has analog pattern signal generation means for generating an analog pattern signal of a predetermined cycle, D/A conversion means for D/A converting the n-bit image data output from said conversion means, and comparison means for comparing the analog pattern signal and an analog image signal output from said D/A conversion means and outputting the pulse-width modulation signal.

14. An apparatus according to claim 13, further comprising means for modulating a beam based on the pulse-width modulation signal and reproducing an image by means of the modulated beam, and means for generating a position signal indicating a scanning position of the modulated beam, said analog pattern signal generation means generating the analog pattern signal in synchronism with the position signal.

15. An apparatus according to claim 13, wherein the analog pattern signal is a triangular wave signal.

16. An apparatus according to claim 10, wherein said image data generation means generates 1-bit halftone-processed image data.

17. An image processing apparatus comprising:
image data generation means for generating m-bit image data;
first conversion means for converting the m-bit image data generated bu said image data generation means into n-bit (n>m) image data;
second conversion means for performing density conversion of the n-bit image data output from said first conversion means, said second conversion means having a plurality of density conversion modes with respect to the n-bit image data; and
gradation process means for gradation processing an output of said second conversion means.

18. An image processing apparatus according to claim 17, wherein said image data generation means generates 1-bit image data.

19. An image processing apparatus according to claim 17, wherein said gradation process means includes pulse-width modulation signal generation means for processing the n-bit image data output from said second conversion means and generating a pulse-width modulation signal.

20. An image processing apparatus comprising:
image data generation means for generating m-bit image data;
first conversion means for converting the m-bit image data generated by said image data generation means into n-bit (n>m) image data;

second conversion means for performing density conversion of the n-bit image data output from said first conversion means; and gradation process means for gradation processing an output of said second conversion means, wherein said first conversion means comprises a memory, and wherein said second conversion means has a plurality of density conversion modes with respect to the n-bit image data.

21. An image processing apparatus according to claim 20, wherein said gradation process means includes pulse-width modulation signal generation means for processing the n-bit image data output from said second conversion means and generating a pulse-width modulation signal.

22. An image processing apparatus comprising:

image data generation means for generating m-bit image data;

first conversion means for converting the m-bit image data generated by said image data generation means into first n-bit (n>m) image data using a first conversion mode; and second conversion means for converting the m-bit image data generated by said image data generation means into second n-bit (n>m) image data, using a second conversion mode different from the first conversion mode; and select means for selecting one of the first and second n-bit image data output respectively by said first and said second conversion means.

23. An apparatus according to claim 22, wherein the m-bit image data comprises halftone-processed image data, and wherein said first conversion mode is a conversion mode associated with the halftone-processed image data.

24. An apparatus according to claim 23, wherein said select means has discrimination means for discriminating characteristics of the m-bit image data, and a selector for selecting the first or the second n-bit image data in accordance with the discrimination result.

25. An apparatus according to claim 24, wherein said discrimination means discriminates, using a predetermined filter, whether or not the m-bit image data is halftone-processed image data.

26. An apparatus according to claim 22, wherein said image data generation means generates halftone-processed bi-level image data.

27. An image processing apparatus comprising:

image data generation means;

conversion means for converting image data generated by said image data generation means and outputting converted image data having a data volume larger than the image data generated by said image data generation means; and select means for selecting a conversion mode of said conversion means;

wherein said conversion means has a first converter for converting the image data in a first mode and outputting the image data so converted, and a second converter for converting the image data in a second mode different from the first mode and outputting the image data so converted, and said select means selects one of the outputs from said first and second converters, and wherein said first converter converts the image data using image data surrounding an image datum currently converted.

* * * * *

UNITED STATES PATENT AND TRADEMARK OFFICE
CERTIFICATE OF CORRECTION

PATENT NO. : 4,926,268
DATED : May 15, 1990
INVENTOR(S) : NAOTO KAWAMURA, ET AL.

It is certified that error appears in the above-identified patent and that said Letters Patent is hereby corrected as shown below:

COLUMN 2

Line 37, "a" (first occurrence) should read --an--.

COLUMN 4

Line 21, "EMBODIMENT" should read --EMBODIMENTS--.
    Line 36, "pressed" should read --presses--.

COLUMN 7

Line 51, "image data 100" should read --image data 101--.

COLUMN 9

Line 26, "H-SYNC signal 114for" should read --H-SYNC signal 114a for--.

COLUMN 10

Line 62, "system" should read --system.--.

COLUMN 11

Line 38, "MSN address" should read --MSB address--.
    Line 53, "Input "0" Output "00"" should read --Input "0"→Output "00"--.

UNITED STATES PATENT AND TRADEMARK OFFICE
CERTIFICATE OF CORRECTION

PATENT NO. : 4,926,268

DATED : May 15, 1990

INVENTOR(S) : NAOTO KAWAMURA, ET AL.

It is certified that error appears in the above-identified patent and that said Letters Patent is hereby corrected as shown below:

COLUMN 12

Line 22, "discriminator 107" should read --discriminator 307--.
    Line 26, "pixel" should read --pixel.--.
    Line 58, "eighth" should read --the eighth--.

COLUMN 14

Line 60, "generatinq" should read --generating--.

COLUMN 15

Line 17, "nization" should read --nism--.

COLUMN 16

Line 45, "bu" should read --by--.

COLUMN 17

Line 26, "data," should read --data--.

UNITED STATES PATENT AND TRADEMARK OFFICE
CERTIFICATE OF CORRECTION

PATENT NO. : 4,926,268
DATED : May 15, 1990
INVENTOR(S) : NAOTO KAWAMURA, ET AL.

It is certified that error appears in the above-identified patent and that said Letters Patent is hereby corrected as shown below:

COLUMN 18

Line 34, "converted" should read --being converted--.

Signed and Sealed this

Tenth Day of September, 1991

Attest:

HARRY F. MANBECK, JR.

*Attesting Officer*  *Commissioner of Patents and Trademarks*